United States Patent
Otake

(10) Patent No.: US 10,354,352 B2
(45) Date of Patent: Jul. 16, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ritsuko Otake, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/630,772

(22) Filed: Jun. 22, 2017

(65) Prior Publication Data
US 2018/0005340 A1 Jan. 4, 2018

(30) Foreign Application Priority Data
Jun. 30, 2016 (JP) .................................. 2016-130601

(51) Int. Cl.
| | |
|---|---|
| *H04N 1/40* | (2006.01) |
| *G06T 1/00* | (2006.01) |
| *H04N 1/405* | (2006.01) |
| *H04N 1/60* | (2006.01) |
| *H04N 5/232* | (2006.01) |
| *H04N 1/407* | (2006.01) |
| *H04N 1/64* | (2006.01) |

(52) U.S. Cl.
CPC ............ *G06T 1/0007* (2013.01); *H04N 1/405* (2013.01); *H04N 1/40012* (2013.01); *H04N 1/4072* (2013.01); *H04N 1/60* (2013.01); *H04N 1/642* (2013.01); *H04N 1/644* (2013.01); *H04N 5/23229* (2013.01)

(58) Field of Classification Search
CPC ......... G06T 1/0007; G06T 7/11; G06T 7/136; H04N 1/40012; H04N 1/405; H04N 1/4072; H04N 1/60; H04N 1/642; H04N 1/644; H04N 5/23229; H04N 1/40
See application file for complete search history.

(56) References Cited

U.S. PATENT DOCUMENTS

| | | | |
|---|---|---|---|
| 2005/0179954 A1* | 8/2005 | Arai | .................. H04N 1/00002 |
| | | | 358/3.26 |
| 2012/0087587 A1* | 4/2012 | Kacher | .................... G06K 9/38 |
| | | | 382/182 |
| 2013/0127705 A1* | 5/2013 | Jung | .................... G06F 3/0304 |
| | | | 345/156 |

FOREIGN PATENT DOCUMENTS

| | | |
|---|---|---|
| CN | 101727583 A | 6/2010 |
| JP | 4-290177 A | 10/1992 |

\* cited by examiner

*Primary Examiner* — Moustapha Diaby
(74) *Attorney, Agent, or Firm* — Canon U.S.A., Inc. I.P. Division

(57) ABSTRACT

In one or more embodiments, an image processing apparatus obtains a shade image representing shade components included in a multi-valued image obtained by capturing an image of a document. The shade components depend on an image capture environment. The apparatus binarizes a pixel value of a target pixel in the multi-valued image based on a pixel value of a corresponding pixel in the shade image at coordinates identical to those of the target pixel to generate a pixel value representing white or black. One or more image processing methods and storage mediums are also provided herein.

11 Claims, 7 Drawing Sheets

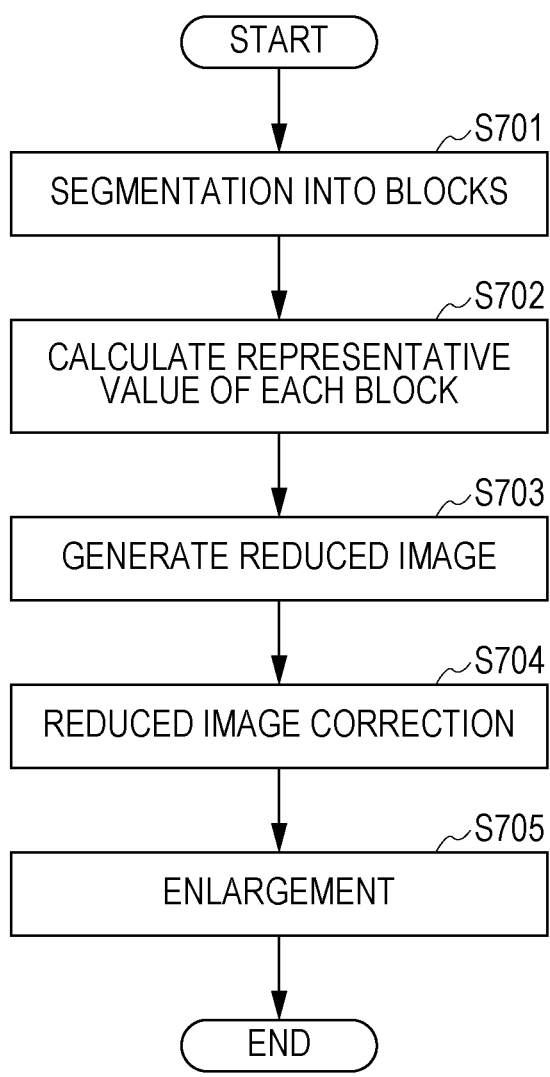

IMAGE PROCESSING APPARATUS, IMAGE PROCESSING METHOD, AND STORAGE MEDIUM

BACKGROUND OF THE INVENTION

Field of the Invention

The present disclosure relates to at least one image processing technique.

Description of the Related Art

A binarization process involves determining whether each pixel value of input color or gray scale image data is greater or less than a threshold value and converting the image data into a monochrome binary image. Japanese Patent Laid-Open No. 4-290177 describes a binarization process that is performed on pixels of image data by using a single threshold value.

In the binarization process described in Japanese Patent Laid-Open No. 4-290177, a shade component that may be included in image data depending on an image capture environment is not taken into consideration. When a shade component included in image data has a pixel value less than the threshold value, the shade component is converted into black by binarization. If a shaded document whose background is blank or white is captured as an image, a shaded white region is converted into black.

SUMMARY OF THE INVENTION

An aspect of the present disclosure provides at least one image processing apparatus including an obtaining unit configured to obtain a shade image representing shade components included in a multi-valued image obtained by capturing an image of a document. The shade components depend on an image capture environment. The apparatus further includes a generating unit configured to binarize a pixel value of a target pixel in the multi-valued image based on a pixel value of a corresponding pixel in the shade image at coordinates identical to those of the target pixel to generate a pixel value representing white or black.

According to other aspects of the present disclosure, one or more additional image processing apparatuses, one or more image processing methods and one or more storage mediums are discussed herein. Further features of the present disclosure will become apparent from the following description of exemplary embodiments with reference to the attached drawings.

BRIEF DESCRIPTION OF THE DRAWINGS

FIG. 7 is a flowchart of a process of generating a threshold map in the first embodiment.

DESCRIPTION OF THE EMBODIMENT

Embodiments of at least one image processing apparatus, image processing method and storage medium of the present disclosure will be described below with reference to the drawings.

First Embodiment

Figure 1:
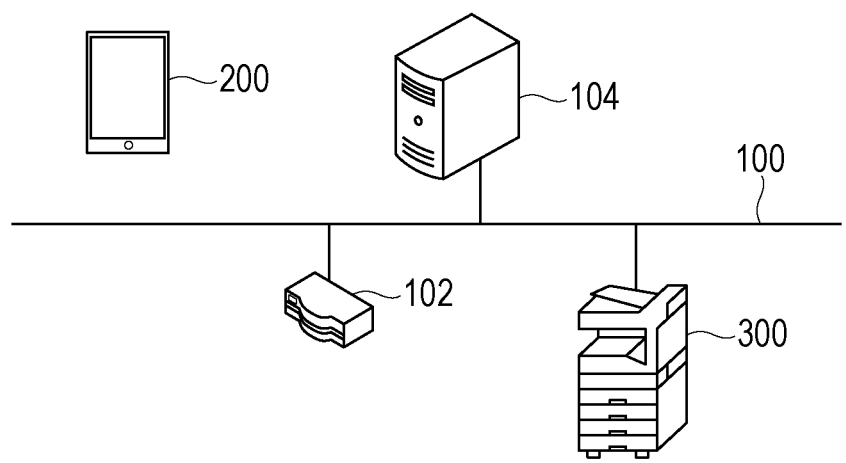
FIG. 1 is a schematic diagram of an exemplary configuration of a system in at least one embodiment of the present disclosure.

FIG. 1 illustrates an overall configuration of a system suitable for at least a first embodiment. A wireless router 102, a computer 104, and a digital multifunction peripheral (MFP) 300 are connected to a local area network (LAN) 100. A mobile terminal 200 can be connected to the digital MFP 300 and the computer 104 via the wireless router 102 and the LAN 100. The mobile terminal 200 and the digital MFP 300 may each function as an image processing apparatus in the present and following embodiments.

Figure 2A:
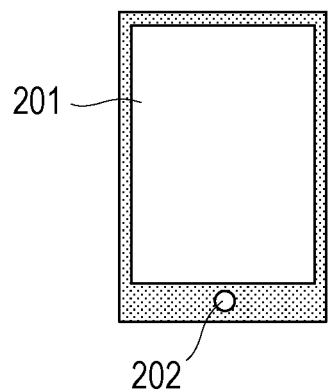
FIGS. 2A and 2B are external views of a mobile terminal.
Figure 2B:
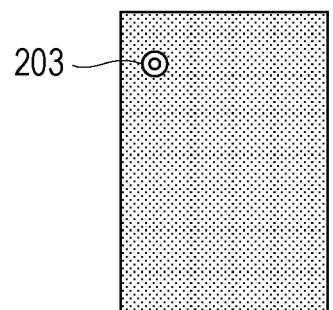

FIGS. 2A and 2B are external views of the mobile terminal 200 in at least one embodiment. The mobile terminal 200 may be any of a variety of types. FIG. 2A illustrates an exemplary front surface of the mobile terminal 200. The mobile terminal 200 includes a touch panel display 201 and an operation button 202 arranged in the front surface. Specifically, the touch panel display 201 is a combined device of a display device for displaying, for example, information, a button, and an image necessary for an operation, and a position input device for receiving an input in response to a touch of a human finger or the like. FIG. 2B illustrates an exemplary rear surface of the mobile terminal 200. The mobile terminal 200 includes an image capture unit 203 disposed in the rear surface. In at least one embodiment, the mobile terminal 200 may be any mobile terminal that has a camera function including the image capture unit 203. Specifically, examples of the mobile terminal 200 include a smartphone, a mobile phone, a tablet terminal, and a notebook computer that have a camera function, a digital camera having a communication function, and a document camera capable of capturing an image of a document in a contactless manner.

Figure 3:
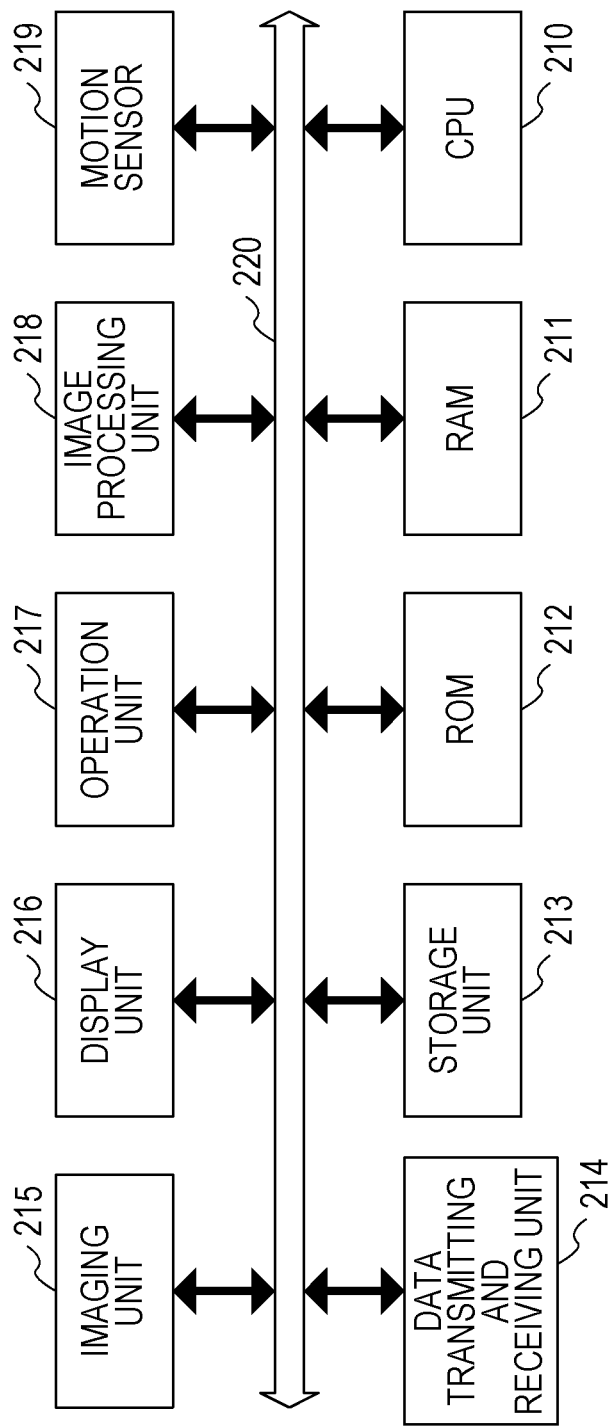
FIG. 3 is a block diagram of an exemplary configuration of at least one embodiment of a mobile terminal.

FIG. 3 is a block diagram illustrating an internal configuration of the mobile terminal 200. This diagram illustrates an exemplary configuration for implementing at least one embodiment. In FIG. 3, a central processing unit (CPU) 210, a random access memory (RAM) 211, and a read-only memory (ROM) 212 transmit and receive programs and data to and from each other through a data bus 220. The data bus 220 is connected to a storage unit 213, a data transmitting and receiving unit 214, an imaging unit 215, a display unit 216, an operation unit 217, an image processing unit 218, and a motion sensor 219. These components, the CPU 210, the RAM 211, and the ROM 212 transmit and receive programs and data to and from each other.

The storage unit 213, which is a flash memory, stores image data and various programs. The data transmitting and receiving unit 214 includes a wireless LAN controller and transmits and receives data to and from the digital MFP 300 and the computer 104 via the wireless router 102. The imaging unit 215, which corresponds to the above-described image capture unit 203, captures an image of a document to obtain image data. The obtained image data is processed by the image processing unit 218 or the CPU 210 through the storage unit 213 or the RAM 211. After that, the processed image data is subjected to processing by the CPU 210. For example, the CPU 210 causes the image data to be displayed on the display unit 216, to be stored in the storage unit 213, and/or to be transmitted to an external device through the data transmitting and receiving unit 214.

The display unit 216 is included in the above-described touch panel display 201. The display unit 216 displays, for example, a live view image of a document to be captured as an image by using the camera function, an image processing result in at least one embodiment, information necessary for notification about a process, and information necessary for an operation.

The operation unit 217 includes a touch panel, which is included in the above-described touch panel display 201, and the operation button 202. The operation unit 217 accepts a user operation and transmits information about the operation to the units or components related to the operation.

In at least one embodiment, the motion sensor 219 includes a three-axis acceleration sensor, an electromagnetic compass, and a three-axis angular velocity sensor. The motion sensor 219 can detect the orientation or movement of the mobile terminal 200 by using a well-known technique.

In at least one embodiment, the CPU 210 runs a program stored in the ROM 212 or the storage unit 213, thus controlling the components of the mobile terminal 101.

Figure 4:
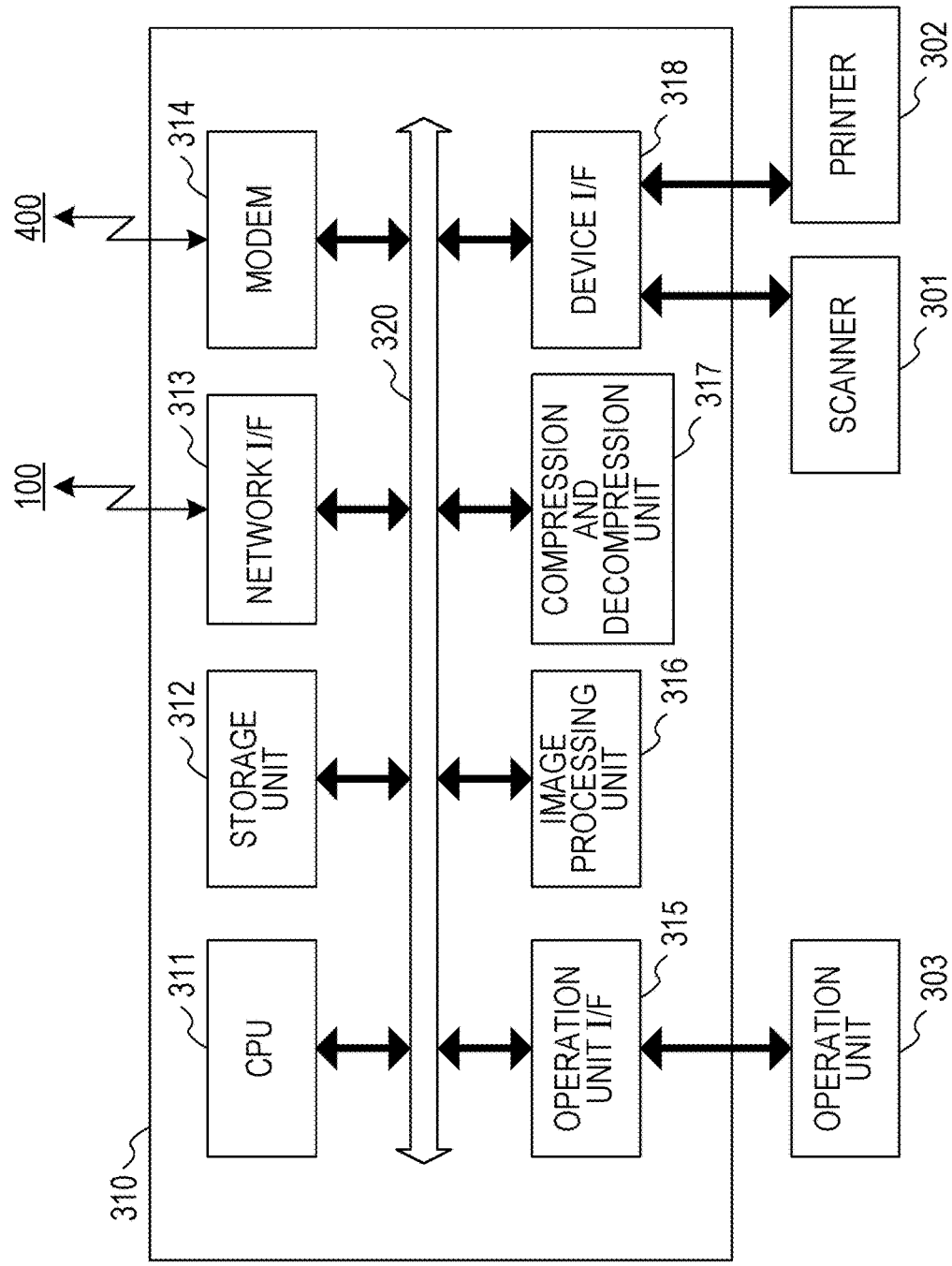
FIG. 4 is a block diagram of an exemplary configuration of at least one embodiment of a digital multifunction peripheral.

FIG. 4 is a diagram illustrating an internal configuration of the digital MFP 300. This diagram illustrates an exemplary configuration for implementing at least one embodiment. Referring to FIG. 4, a controller unit 310 is connected to a scanner 301, serving as an image input apparatus, and a printer 302, serving as an image output apparatus. The controller unit 310 is further connected to the LAN 100 and a public communication line 400 for input and output of image data and device information. The controller unit 310 controls the entire system. A CPU 311 functions as a controller that controls the entire digital MFP 300. An operation unit interface (I/F) 315 is an interface unit for an operation unit 303. The operation unit I/F 315 outputs image data, which is to be displayed on a display unit (not illustrated) included in the operation unit 303, to the operation unit 303. In addition, the operation unit I/F 315 is responsible for transmitting information input through the operation unit 303 by a user to the CPU 311. A network I/F 313 is connected to the LAN 100 for data input/output. A modem 314 is connected to the public communication line 400 and performs modulation or demodulation to transmit or receive data. A storage unit 312 stores image data and compressed data, and includes a system work memory for operation of the CPU 311. A device I/F 318 connects the controller unit 310 to the scanner 301 and the printer 302, and converts image data synchronously or asynchronously. An image processing unit 316 corrects, processes, and/or edits image data input from the scanner 301 or the outside (e.g., from an external device, from a scanner, etc.) through, for example, the network I/F 313. The CPU 311, the storage unit 312, the network I/F 313, the modem 314, the operation unit I/F 315, the image processing unit 316, a compression and decompression unit 317, and the device I/F 318 are connected to a data bus 320.

The scanner 301 applies light to a document, reads reflected light with a light receiving element, such as a charge-coupled device (CCD) line sensor, and converts the light into an electrical signal indicating an image on the document to generate digital image data. The printer 302 forms an image based on the image data onto a sheet and outputs the sheet. Any image forming method, such as electrophotography or an ink-jet method, may be used.

The digital MFP 300 with the above-described configuration can print an image based on image data transmitted from, for example, the mobile terminal 200 via the wireless router 102 and the LAN 100 and transmit the image data through the modem 314 by facsimile.

Figure 5:
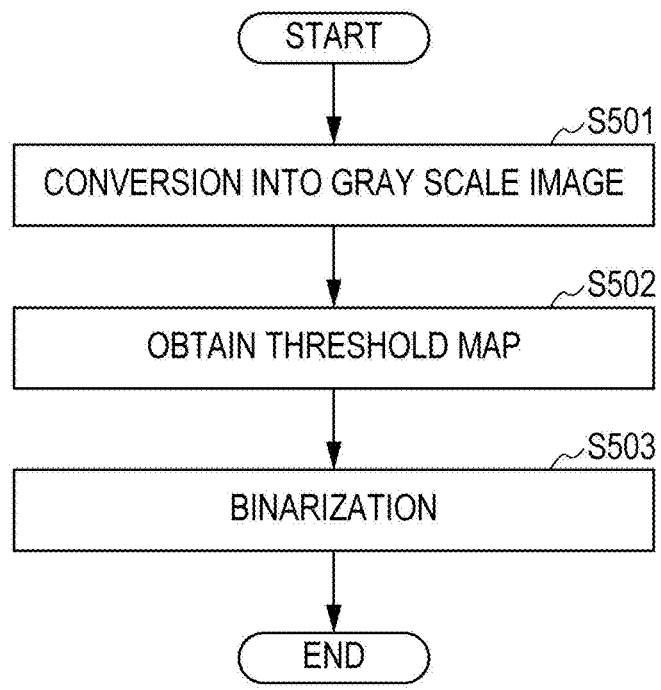
FIG. 5 is a flowchart in at least a first embodiment.

FIG. 5 is a flowchart illustrating an image binarization process in at least one embodiment. The process is started when an image captured with the camera function including the image capture unit 203 by the mobile terminal 200, an image stored in the storage unit 213, or an image received from an external device is obtained as an input image.

In step S501, the image processing unit 218 converts the input image, which is a multi-valued image, into a gray scale image. If the input image is a gray scale image, processing in step S501 can be omitted. In step S501, assuming that the input image is a color image represented by three color channels of red (R), green (G), and blue (B), the three channels are mixed at a predetermined ratio to generate a one-channel image. Any mixture ratio may be used. For example, the National Television Standards Committee (NTSC) weighted average method may be used to generate a gray scale image. In this case, the input image is a multi-valued image obtained by capturing an image of a document and the multi-valued image includes shade components that depend on an image capture environment.

In step S502, the image processing unit 218 obtains a threshold map. The threshold map is a shade image representing the shade components that are included in the input image and that depend on the image capture environment. The threshold map may be obtained by reading a gray scale image that has been obtained by capturing an image of a blank sheet in the image capture environment and that has been stored in, for example, the storage unit 213. Alternatively, the threshold map may be obtained by analyzing brightness feature amounts of the input image (multi-valued image) and estimating shade components included in the input image. The process of obtaining the threshold map from the input image will be described later in detail with reference to FIG. 7.

In step S503, the image processing unit 218 generates a binary image from the gray scale image and the threshold map. For convenience of explanation, it is assumed that each of the gray scale image and the threshold map is composed of pixels having 8-bit pixel values each representing a luminance component, a pixel value of 0 represents black, and a pixel value of 255 represents white. In addition, a binary image to be output is composed of pixels having 1-bit pixel values, a pixel value of 0 represents white, and a pixel value of 1 represents black. In the following description, g(x, y) denotes a pixel value at coordinates (x, y) in the gray scale image, t(x, y) denotes a pixel value at the coordinates (x, y) in the threshold map, and b(x, y) denotes a pixel value at the coordinates (x, y) in the binary image to be output. As represented by Expression (1), the image processing unit 218 compares the pixel value g(x, y) of the gray scale image and the pixel value t(x, y) of the threshold map at the same coordinates to determine whether the pixel value b(x, y) of the binary image represents 0 (white) or 1 (black), thus generating the binary image.

$$\text{If } g(x,y) \geq t(x,y), b(x,y) = 0$$

$$\text{If } g(x,y) < t(x,y), b(x,y) = 1 \quad (1)$$

Specifically, when a pixel value representing the luminance component of a target pixel in the gray scale image is greater than or equal to a pixel value representing the luminance component of a corresponding pixel, located at the same coordinates as those of the target pixel, in the threshold map representing the shade components, a pixel value representing white is generated. In addition, when the pixel value representing the luminance component of the target pixel in the gray scale image is less than the pixel value representing the luminance component of the corresponding pixel, located at the same coordinates as those of the target pixel, in the threshold map representing the shade components, a pixel value representing black is generated. In step S503, each of the pixels of the gray scale image is subjected to the binarization process, thus generating a binary image.

As described above, the binarization process suitable for each pixel of the input image is performed by using the threshold map.

Figure 6A:
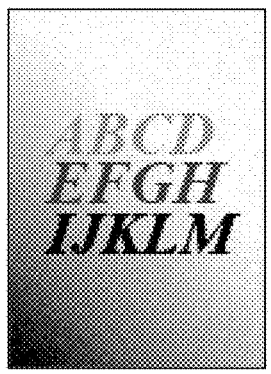
FIGS. 6A to 6C illustrate an example of binarization of an image in the first embodiment.
Figure 6B:
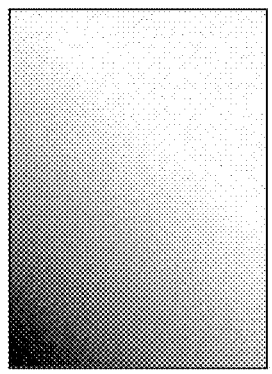
Figure 6C:

FIGS. 6A to 6C illustrate an example of binarization of an image in at least one embodiment. FIG. 6A illustrates an input image whose background behind character strings is uneven, which is caused by shade in an image capture environment. FIG. 6B illustrates a threshold map corresponding to the input image. On the threshold map, the distribution of components of the shade in the image capture environment appears. FIG. 6C illustrates an exemplary resultant image obtained by binarizing the input image using the threshold map. In this image, the shade in the image capture environment is not reproduced and only the character strings in the foreground of the image are converted in black.

FIG. 7 is a flowchart illustrating the processing (hereinafter, "process") in step S502 in FIG. 5. In this process, the image processing unit 218 estimates the threshold map from the input image.

In step S701, the image processing unit 218 segments the input image into a plurality of blocks. In this segmentation, each block may have any shape and include any number of input pixels. For example, each block may be a square such that the number of input pixels arranged in a longitudinal direction of the block is the same as that in a lateral direction thereof. The number of blocks in each of the longitudinal and lateral directions of the input image may be determined such that the number of blocks ranges from 8 to 64. The number of blocks may be fixed or changed in accordance with input image conditions.

In step S702, the image processing unit 218 calculates a representative pixel value of each of the blocks obtained by segmentation. The representative pixel value is determined by selecting relatively bright pixels from input pixels included in the block and using the selected pixels. The easiest method of calculating a representative pixel value involves setting a pixel value of the brightest pixel in the block to a representative pixel value. Another method involves selecting a predetermined number of bright pixels in order from the brightest pixel in the block, averaging pixel values of the selected pixels, and setting the average to a representative pixel value. Further another method involves selecting pixels having luminance values within a predetermined range in order from the brightest pixel in the block, averaging pixel values of the selected pixels, and setting the average to a representative pixel value. Furthermore, a representative pixel value may be calculated by using a histogram of pixel values in the block. In addition, a method of clustering pixel values in the block into clusters, calculating a cluster representative value of each of the clusters, and setting a cluster representative value having the highest luminance value to a representative pixel value can be used. When the block includes a background region of a subject, the representative pixel value calculated in this manner is substantially equal to a value obtained by adding a shade component generated at image capture to a background level. When the block does not include a background region, the calculated representative pixel value is a value obtained by adding a shade component to a relatively bright object region in the block.

After the representative pixel values of all of the blocks are obtained in the above-described manner, the image processing unit 218 generates a reduced image composed of the representative pixel values of the blocks in step S703. This image composed of the representative pixel values of the blocks is a reduced image obtained by reducing the input image such that the number of pixels is determined by the number of blocks in the above-described segmentation. This reduced image serves as a base image to be subjected to a subsequent shade estimation process. In step S704, the image processing unit 218 performs correction processing to leave the shade components in the reduced image, serving as the base image. In this correction processing, the representative pixel value of the above-described block including no background region is corrected by using the representative pixel value of the next block including the background region. Consequently, values obtained by adding the shade components to the background level remain in the reduced image.

In step S705, the image processing unit 218 enlarges the reduced image composed of the values, obtained by adding the shade components to the background level, such that an enlarged image has the same number of pixels as that of the input image. Any method of enlargement may be used. Each pixel value after enlargement is determined by, for example, interpolation calculation using values of four adjacent pixels before enlargement corresponding to each pixel after enlargement and a weight coefficient corresponding to a positional relationship between each of the four adjacent pixels before enlargement and the pixel after enlargement. The enlarged image is an image that has the same size as that of the input image and in which the shade components are added to the background level. The enlarged image is a threshold map that represents the distribution of background-foreground separation levels varying in the image. As described above, the threshold map can be generated from the input image.

Although the binarization process in at least one embodiment is mainly performed by the image processing unit 218 in the mobile terminal 200 as described above, similar processing can be performed by the CPU 210, or the image processing unit 316 or the CPU 311 in the digital MFP 300. Furthermore, similar processing can be performed by the computer 104 or, for example, a server (not illustrated) on the network.

As described above, if an input image includes shade components representing shade or unevenness, a threshold value for binarization of the image can be properly changed, thus achieving high image quality binarization.

Second Embodiment

In the first embodiment, the threshold map is obtained and used to provide threshold values for pixels. However, an optimum binary image may fail to be obtained depending on the characteristics of an input image or the use of a binarized image. At least a second embodiment provides a method involving adjusting threshold values of a threshold map in accordance with conditions and binarization processing using the adjusted threshold values. A description of the same details as those in the first embodiment is omitted.

Figure 8:
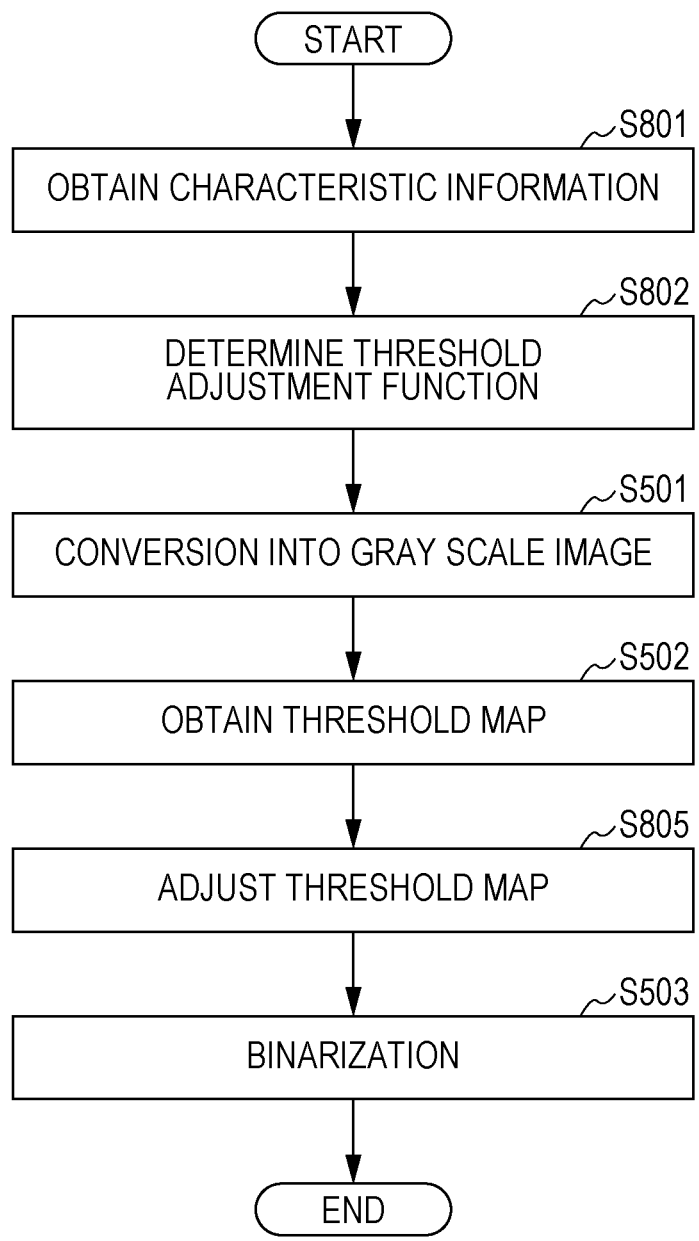
FIG. 8 is a flowchart in at least a second embodiment.

FIG. 8 is a flowchart illustrating a process in the second embodiment. The process involves adjusting threshold values of a threshold map in accordance with conditions, as described above, and binarization processing using the adjusted threshold values. The process is started when an image captured with the camera function including the imaging unit 203 by the mobile terminal 200, an image stored in the storage unit 213, or an image received from an external device is obtained as an input image.

In step S801, the CPU 210 obtains information about, for example, how the input image has been obtained and a use of a binarized image. At the same time, the image processing unit 218 analyzes the input image to obtain characteristic information. The obtained information is, for example, at least one of the following information items:

- the type of input device (e.g., an image captured with the camera function of the mobile terminal 200, a camera-captured image obtained from the outside (e.g., from an external device, from a scanner, obtained or received via the network I/F 313, etc.), or a scanned image obtained from the outside);
- the use of a binary image (e.g., optical character recognition (OCR) processing, specific pattern detection, foreground image separation, or image data transmission by, for example, facsimile);
- the number of pixels (e.g., the number of pixels in the longitudinal direction and that in the lateral direction of the input image, the total number of pixels of the input image, or resolution information); and
- image characteristics (e.g., the amount of edges, the number or complexity of colors included in the input image, the degree of shade included in the input image, or the degree of unevenness of the background of the input image).

Known techniques can be used to obtain the image characteristics. For example, the amount of edges is defined based on the number of edge pixels extracted by a typical edge extraction method. The number or complexity of colors included in an image can be easily calculated by using, for example, variances of pixel values. The degree of shade included in an image or the degree of unevenness of the background of the image can be defined based on the contrast (i.e., the difference between a maximum pixel value and a minimum pixel value) of an image to be defined as a threshold map or based on variances.

In step S802, a threshold adjustment function is determined in accordance with the characteristic information obtained in step S801 by the CPU 210. For example, it is assumed that the threshold adjustment function is determined based on information about the use of a binary image (binarized image).

Assuming that the binarized image is to be subjected to OCR processing, it is important to prevent characters to be detected from being lost by binarization. For this reason, threshold values are adjusted so that a faint character or a relatively pale character is converted into black, even if noise may be converted into black. For the sake of simplicity, this adjustment process involves adding offset to a threshold value of each pixel.

$$t'(x,y)=t(x,y)+\alpha$$

where t'(x, y) denotes an adjusted threshold value at coordinates (x, y), t(x, y) denotes a pixel value at the coordinates (x, y) in the threshold map, and α denotes a positive offset value.

Assuming that the binarized image is to be transmitted to the digital MFP 300 via the LAN 100 and be then fax-transmitted to an external device through the modem 314, it is important to prevent, for example, characters from being lost by binarization and to reduce noise as much as possible. For the sake of simplicity, this adjustment process also involves adding offset to a threshold value of each pixel.

$$t''(x,y)=t(x,y)+\beta$$

where t"(x, y) denotes an adjusted threshold value at coordinates (x, y), t(x, y) denotes a pixel value at the coordinates (x, y) in the threshold map, and β denotes a negative offset value, whose absolute value is less than that of α.

Figure 9A:
FIGS. 9A and 9B illustrate exemplary images binarized by using adjusted threshold values.

FIG. 9A illustrates an exemplary resultant image obtained by binarizing the input image of FIG. 6A using the threshold value t'(x, y), adjusted as described above, in each of the pixels of the threshold map of FIG. 6B. Although high-density shade in left lower part of the image is not converted into white, the characters are reproduced in black with reliability, thus keeping image quality suitable for an input image to be subjected to OCR processing.

Figure 9B:

FIG. 9B illustrates an exemplary resultant image obtained by binarizing the input image of FIG. 6A using the threshold value t"(x, y), adjusted as described above, in each of the pixels of the threshold map of FIG. 6B. Although the input image includes shade whose density is locally high, the shade is converted into white with reliability. Such image quality is suitable for, for example, an image to be fax-transmitted because noise in such an image is expected to be reduced. However, the upper character string is pale. Although the upper character string is readable, such image quality is not suitable to, for example, OCR processing.

Referring again to FIG. 8, in step S501, the image processing unit 218 converts the input image into a gray scale image. In step S502, the image processing unit 218 generates a threshold map. These steps are the same as those in the first embodiment.

In step S805, the image processing unit 218 performs processing of adjusting the threshold map. Specifically, this processing is converting each pixel of the threshold map by using the threshold adjustment function determined in step S802, as described above.

Finally, in step S503, the image processing unit 218 binarizes the converted input image, or the gray scale image in accordance with the adjusted threshold map. This processing is the same as that in the first embodiment.

In one or more embodiments, steps S805 and S503 may be combined into one step, in which the image processing unit 218 binarizes each pixel of the input image while adjusting the threshold map by using the threshold adjustment function determined in step S802.

The threshold map is adjusted in accordance with conditions as described above, so that the binarization process can be performed more effectively.

According to the present disclosure, if shade components are included in a multi-valued image obtained by capturing an image of a document, the image can be binarized such that the influence of the shade components is reduced and image quality is enhanced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU), etc.) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-130601 filed Jun. 30, 2016, which is hereby incorporated by reference herein in its entirety.

What is claimed is:

1. An image processing apparatus comprising:
a memory;
a processor that causes, by executing a set of instructions stored in the memory, the image processing apparatus to:
obtain a shade image representing shade components included in a multi-valued image obtained by capturing an image, the shade components depending on an image capture environment; and
binarize a pixel value of a target pixel in the multi-valued image based on a pixel value of a corresponding pixel in the shade image at coordinates identical to those of the target pixel to generate a pixel value representing white or black.

2. The apparatus according to claim 1, wherein the processor causes the image processing apparatus to generate a pixel value representing white from the target pixel in the multi-valued image when a pixel value representing a luminance component of the target pixel in the multi-valued image is greater than or equal to a pixel value representing a luminance component of the corresponding pixel in the shade image.

3. The apparatus according to claim 1, wherein the processor causes the image processing apparatus to generate a pixel value representing black from the target pixel in the multi-valued image when a pixel value representing a luminance component of the target pixel in the multi-valued image is less than a pixel value representing a luminance component of the corresponding pixel in the shade image.

4. The apparatus according to claim 1, wherein the multi-valued image has pixel values including the shade components that depend on the image capture environment.

5. The apparatus according to claim 1, wherein the multi-valued image is a gray scale image.

6. The apparatus according to claim 1, wherein the processor causes the image processing apparatus to obtain the shade image by analyzing brightness feature amounts of the multi-valued image.

7. The apparatus according to claim 1, wherein the shade image representing the shade components that depend on the image capture environment is a gray scale image obtained by capturing an image of a blank sheet in the image capture environment.

8. The apparatus according to claim 1, wherein the processor causes the image processing apparatus to binarize pixel values of the multi-valued image by using adjusted pixel values of the shade image, and the adjusted pixel values are obtained by adjusting pixel values of the shade image in accordance with information about how the multi-valued image has been obtained.

9. The apparatus according to claim 8, wherein the information about how the multi-valued image has been obtained indicates a type of device through which the multi-valued image has been obtained.

10. An image processing method comprising:
obtaining a shade image representing shade components included in a multi-valued image obtained by capturing an image, the shade components depending on an image capture environment; and
binarizing a pixel value of a target pixel in the multi-valued image based on a pixel value of a corresponding pixel in the shade image at coordinates identical to those of the target pixel to generate a pixel value representing white or black.

11. A non-transitory computer readable storage medium storing a program for causing a computer to perform an image processing method, the image processing method comprising:
obtaining a shade image representing shade components included in a multi-valued image obtained by capturing an image, the shade components depending on an image capture environment; and
binarizing a pixel value of a target pixel in the multi-valued image based on a pixel value of a corresponding pixel in the shade image at coordinates identical to those of the target pixel to generate a pixel value representing white or black.

* * * * *